UNITED STATES PATENT OFFICE 2,618,640

CERTAIN AMINO HYDROCARBON SULFONES AND PROCESS OF PREPARATION

Sydney Archer and Chester M. Suter, Albany County, and Benjamin F. Tullar, Rensselaer, N. Y., assignors to Sterling Drug Inc., Wilmington, Del., a corporation of Delaware No Drawing. Application May 18, 1948,
Serial No. 27,826

22 Claims. (Cl. 260—293.4)

This invention relates to basic sulfones and to methods of preparing the same.

More particularly, the basic sulfones of this invention are those having the formula $$B-X-C(Ar)(Ar')-SO_2-R$$

where B is a lower aliphatic tertiary-amino group, X is a lower alkylene group, Ar and Ar' are aryl groups, and R is a lower hydrocarbon radical. These basic sulfones are of interest because of their pharmaceutical value, especially because of their analgesic activity.

In the above formulas the lower aliphatic tertiary-amino group, designated as B, comprehends lower dialkylamino groups illustrated by examples such as dimethylamino, diethylamino, di-n-butylamino, ethylmethylamino, and the like; and lower saturated N-heterocyclic groups illustrated by examples such as 1-piperidyl, 2-methyl-1-piperidyl, 1-pyrrolidyl, 4-morpholinyl, and the like. In other words, BH designates a lower aliphatic secondary-amine as illustrated by diethylamine, di-n-butylamine, morpholine, 2,6-dimethylpiperidine, and the like. The lower alkylene group, designated as X, preferably contains 2–6 carbon atoms and includes such examples as —CH₂CH₂—, —CH₂CH₂CH₂—,

—CH₂CH₂CH₂CH₂—

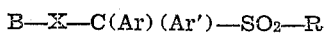

—CH₂CH₂CH₂CH₂CH₂—, —CH₂CH₂CH₂CH(CH₃)

and the like. Ar and Ar', which can be the same or different, are each aryl radicals of preferably 6–10 carbon atoms. The aryl radicals can be substituted by such groups as hydroxy; alkoxyl such as methoxyl, ethoxyl, etc.; dialkylamino such as dimethylamino; halogen, such as chloro, bromo, or iodo; and lower alkyl such as methyl, ethyl, butyl, etc.; and other groups which the chemist appreciates will be unaffected by the reaction conditions used in the preparation of the basic sulfones of our invention. Moreover, Ar and Ar' can be linked in ortho positions, either directly to form the fluorene ring, or through such atoms as carbon, oxygen, sulfur, or nitrogen to form respectively the rings of 9,10-dihydroanthracene, xanthene, thioxanthene, or acridan. The hydrocarbon radical, designated by R in the formula above, is preferably a lower hydrocarbon group of 1–8 carbon atoms including alkyl groups such methyl, ethyl, n-propyl, n-butyl, 2-butyl, t-amyl, n-octyl, and the like; and cycloalkyl groups such as cyclohexyl, cyclopentyl, cyclopropyl, 2-methylcyclohexyl, and the like. Specific examples of compounds comprehended by our invention include the following:

(1). 3 - diethylamino - 1,1 - diphenylpropyl n-propyl sulfone,

(2). 3 - dimethylamino - 2 - methyl - 1,1 - diphenylpropyl n-butyl sulfone,

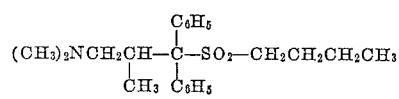

(3). 4 - (1 - piperidyl) - 1 - (3-ethoxyphenyl) - 1-phenylbutyl ethyl sulfone,

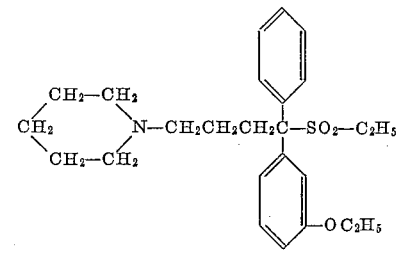

(4). 3 - (2 - methyl - 1 - piperidyl) - 1,1 - bis-(4-methoxyphenyl)propyl cyclopentyl sulfone,

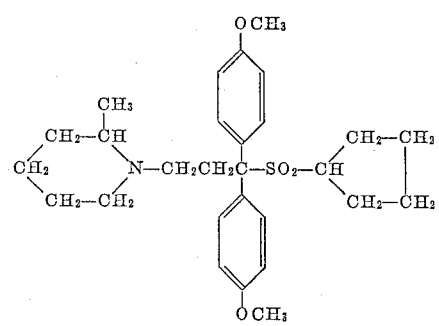

(5). 5 - dimethylamino - 1,1 - diphenylpentyl methyl sulfone,

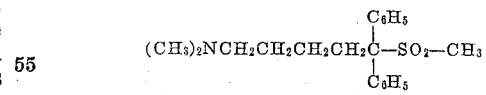

(6). 9 - (2 - (4 - morpholinyl)ethyl) - 9 - fluorenyl methyl sulfone,

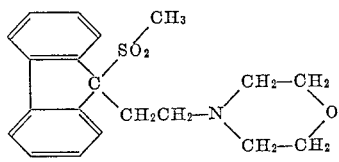

(7). 10 - (2 - dimethylamino - 1 - propyl) -10-thioxanthenyl ethyl sulfone,

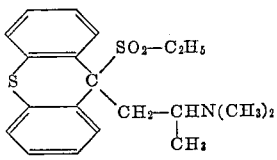

(8). 3-(di - n - butylamino)-1,1-diphenylpropyl cyclohexyl sulfone,

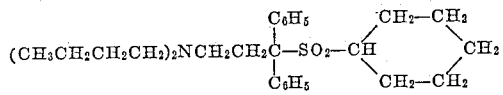

The compounds of our invention can be prepared by different methods. One method is represented by the following series of reactions:

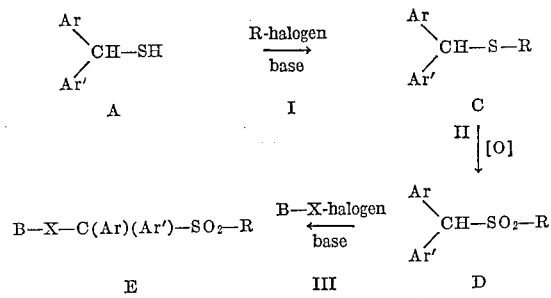

The designations Ar, Ar', R, B, and X have the same meanings as hereinbefore given. In step I a diarylmethanethiol (A) is treated with a hydrocarbon halide, R-halogen, in the presence of a strong base, such as an alkali alkoxide, an alkali triphenylmethyl, sodium hydride, or the like, to form a sulfide, C. This sulfide is oxidized in step II (by methods later to be illustrated) to yield the corresponding sulfone, D, which, in step III, is condensed with a tertiary-aminoalkyl halide, B—X-halogen, in the presence of a strongly basic condensing agent, such as sodium amide, sodium hydride, phenyllithium, or the like, to yield the basic sulfone, E. Illustrative of this method is the preparation of 3-diethylamino-1,1-diphenylpropyl ethyl sulfone by the following steps: I. Diphenylmethanethiol, in ethanolic solution, is treated with ethyl iodide in the presence of sodium ethoxide to give benzohydryl ethyl sulfide; II. This sulfide is oxidized with hydrogen peroxide to produce the corresponding sulfone; III. The resulting sulfone is condensed with 2-diethylaminoethyl chloride in the presence of sodium amide to yield 3-diethylamino-1,1-diphenylpropyl ethyl sulfone having the formula

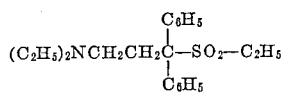

Examples of the type of mercaptan designated hereinabove as a diarylmethanethiol, and represented by A above, are known; thus diphenylmethanethiol was prepared by Staudinger and Siegwart (Ber. 49, 1918 (1916)) by the action of hydrogen sulfide on diphenyldiazomethane. We have found that this thiol can be prepared by a more convenient method involving treating benzohydryl chloride with thiourea to form the corresponding thiuronium chloride which in turn, is readily hydrolyzed to diphenylmethanethiol. We have found that the thiuronium salt can be isolated in a pure state, but we prefer to hydrolyze the crude salt directly according to the usual method ("Organic Synthesis," 21, 36 (1941)). In this way we are able to obtain a fairly constant boiling, pale blue oil which according to iodometric assay is benzohydryl mercaptan of about 85% purity. The contaminants are probably some of the corresponding sulfide and diphenylmethane, the latter possibly being formed by disproportionation during the hydrolysis. By the same method of analysis the undistilled thiol is shown to be about 75% pure. The compound in either state of purity is suitable as an intermediate in carrying out our invention. Similarly, using other diarylmethyl halides we are able to obtain the corresponding mercaptans which are suitable for further use even in impure form (see step I above); for example, using 9-chlorofluorene, 9-fluorenethiol is obtained.

In step II above, the oxidation of the sulfide, C, to the corresponding sulfone, D, is readily accomplished by using oxidizing agents well suited for this purpose, such as hydrogen peroxide, chromic anhydride ($CrO_3$), potassium permanganate, etc. (see "Organic Chemistry of Sulfur" by Suter, John Wiley & Sons, Inc., Chapman & Hall, Ltd., London, 1944, pp. 660–67).

In practicing step III we prefer to use sodium amide as the condensing agent because of its availability and low cost. Toluene is preferred as the reaction medium, however other solvents, in view of what has been said, will suggest themselves to those skilled in the art. Such solvents include benzene, xylene or other suitably volatile liquid inert hydrocarbons. Usually the mildly exothermic reaction starts at about 80° C. and is completed by refluxing the reaction mixture for a few hours. The tertiary-aminoalkyl halide, designated as B—X-halogen above, can be used as such or in the form of an acid-addition salt, e. g. the hydrochloride, sulfate, etc. When a salt is used an extra equivalent of sodium amide is employed. After the excess condensing agent has been destroyed, e. g., with ethanol, the basic sulfone is extracted from the reaction mixture with dilute hydrochloric acid. In many instances the reaction product separates in crystalline form after treatment of the acidic extract with dilute base such as aqueous sodium hydroxide solution. If the basic sulfone cannot readily be obtained solid, it is usually possible to purify it by conversion to the hydrochloride or some other suitable salt.

In the condensation of a tertiary-aminoalkyl halide, B—X-halogen, with a diarylmethyl hydrocarbon sulfone, $ArCH(Ar')SO_2R$, said condensation being designated as step III above, there is the theoretical possibility of two different types of condensation products being formed, depending on whether the entering tertiary-aminoalkyl group replaces the diarylmethyl hydrogen or an alpha-hydrogen of the hydrocarbon group. These two theoretical possibilities are represented by the following formulas

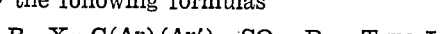

and

where B, X, Ar, Ar' and R have the meanings hereinabove specified and R' is R minus an alpha-hydrogen atom. We have found two types of evidence that strongly indicate the above condensation results in the formation of the basic sulfones of Type I.

One type of evidence involves the synthesis of a compound of Type II (Compounds of this type are disclosed and claimed in the copending Archer and Suter application Serial No. 150,556, filed March 18, 1950) and the comparison of the properties of this basic sulfone with those of the basic sulfone prepared by condensing a diarylmethyl hydrocarbon sulfone with a tertiary-aminoalkyl halide. We have condensed methyl benzohydryl sulfone with 2-(1-piperidyl)-ethyl chloride and thus we have obtained a basic sulfone of M.P. 122–123° C. This compound could conceivably be either Y or Z.

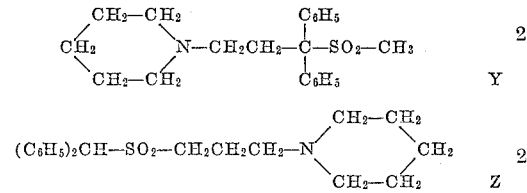

It proves not to be Z, and therefore must be Y, by the following argument. We prepared benzohydryl 3-(1-piperidyl)propyl sulfone, Z, of known structure according to the following equations:

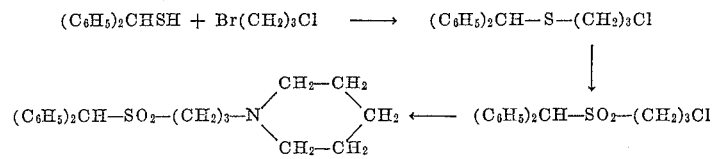

The last step is carried out by treating the intermediate benzohydryl 3-chloropropyl sulfone with piperidine. The basic sulfone thus obtained melts at 120–121° C. Despite the proximity of melting points of the two basic sulfones, admixture of the two specimens results in a large melting point depression. Therefore the product obtained by the treatment of benzohydryl methyl sulfone with 2-(1-piperidyl)ethyl chloride must must be Y, or 3-(1-piperidyl)-1,1-diphenylpropyl methyl sulfone.

Another type of evidence that compounds of Type I above are formed by the condensation of a tertiary-aminoalkyl halide with a diarylmethyl hydrocarbon sulfone is afforded by another method which is fully described below in Example 3C. Therein is shown that a basic sulfone obtained by said condensation when degraded results in the formation of a tertiary-amine which must be formed from a basic sulfone of Type I and not from one of Type II.

Another mode of synthesis of our basic sulfones is afforded by the method presented in the following equations:

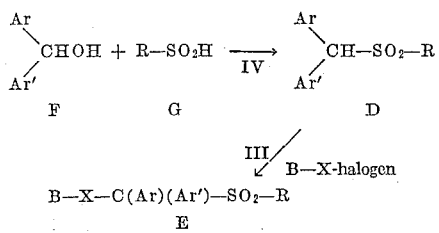

An illustration of this method of preparation is the synthesis of 4-dimethylamino-1,1-bis(4-dimethylaminophenyl)butyl ethyl sulfone. This can be obtained by treating bis(4-dimethylaminophenyl) caribinol with ethanesulfinic acid in the presence of dilute acid, e. g. hydrochloric, to give bis(4-dimethylaminophenyl)methyl ethyl sulfone (step IV) and condensing this sulfone (step III) with 3-dimethylaminopropyl chloride. The resulting basic sulfone has the formula

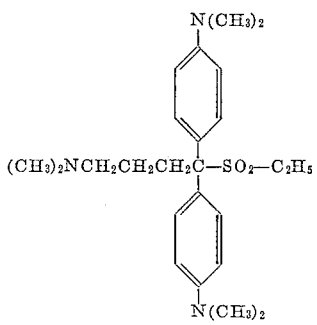

The intermediate sulfones designated as D also can be prepared by other means; such as, by treating a diarylmethyl halide, having the formula Ar(Ar')CH-halogen, with a salt of a hydrocarbon-sulfinic acid, RSO₂H, or by treating a diarylmethyl halide, Ar(Ar')CH-halogen, with a hydrocarbon-thiol, RSH, to give the sulfide, Ar(Ar')CH—S—R, which is then oxidized to the corresponding sulfone. Illustrative of the former method is the preparation of bis(4-methoxyphenyl)methyl n-propyl sulfone from bis(4-methoxyphenyl)methyl chloride and sodium n-propanesulfinate.

It is often convenient to isolate and use the basic sulfones of our invention as the water-soluble hydrochloric acid addition salts. It is, of course, understood that other water-soluble salts, such as those derived from other nontoxic inorganic acids, including hydrobromic acid, sulfuric acid, phosphoric acid, sulfamic acid, and the like, and non-toxic organic acids, including tartaric acid, citric acid, succinic acid, acetic acid, benzoic acid, oleic acid, and the like, will serve the same purpose and are within the scope of our invention.

Also within the scope of our invention are the quaternary salts of our basic sulfones derived from union of the basic sulfones with esters of inorganic acids, e. g. methyl iodide, ethyl bromide, benzyl chloride, and the like.

The following examples will further illustrate specific embodiments of the invention.

EXAMPLE 1

A. *Diphenylmethanethiol.*—A solution of 254 g. of benzohydryl chloride, and 97.5 g. of thiourea in 510 ml. of alcohol is refluxed for two hours. A solution of 76 g. of sodium hydroxide in 600 ml. of water is then added and refluxing continued for two hours more during which time a pink oil separates. The mixture is cooled and the supernatant aqueous layer decanted. The aqueous solution is treated with dilute sulfuric acid (10 ml. of concentrated acid in 100 ml. of water) and extracted with ether. The ether extract is combined with the pink oil, and the resulting solution is dried and distilled to give 209 g. of a pale blue liquid boiling mainly at 135° C. at 1.5 mm. and mainly comprising diphenylmethanethiol (benzohydryl mercaptan).

The above procedure can be carried out using benzene rather than ether for the extraction. The oil that remains after removal of the benzene by distillation is about 75% diphenylmethanethiol according to iodimetric assay. A portion is distilled and the fraction distilling at 122–5° C. at 0.8 mm. analyzes for diphenylmethanethiol of about 83% purity. Either the distilled or undistilled product is satisfactory for further use as described below (see Example 1–B).

The above procedure also can be carried out substituting an equivalent amount of benzohydryl bromide for the corresponding chloride.

The isothiuronium salt is obtained when a solution of 365 g. of benzohydryl chloride and 137 g. of thiourea in 710 ml. of ethanol is refluxed for two hours and then cooled. About 440 g. (88%) of a white crystalline solid, benzohydrylisothiuronium chloride, which after crystallization from ethanol melts at 196° C., is obtained.

B. *Benzohydryl ethyl sulfone.*—To a solution of sodium ethylate prepared from 3.5 g. of sodium and 200 ml. of absolute ethanol are added 30 g. of diphenylmethanethiol of 75% purity (see Example 1–A) and 22.4 g. of ethyl iodide. The solution is stirred under reflux for three hours and then poured into ice water. The oil is taken up into ether, the ether solution dried over anhydrous sodium sulfate, and the ether removed in vacuo on the steam bath. To insure removal of excess ethyl iodide, ethanol is added to the crude concentrate and the solution concentrated again. The residue is dissolved in 115 ml. of acetic acid, and 115 ml. of 30% hydrogen peroxide solution is added dropwise with stirring over a period of about thirty minutes while maintaining the temperature at 80–98° C. The resulting mixture is stirred for an additional thirty minutes and then poured onto ice. The solid that separates is filtered and recrystallized from dilute ethanol to yield about 25 g. of benzohydryl ethyl sulfone, M. P. 135–6° C.

C. *3 - (1- piperidyl) -1,1- diphenylpropyl ethyl sulfone.*—A mixture of 39 g. of benzohydryl ethyl sulfone, 22.2 g. of 2-(1-piperidyl)ethyl chloride, and 6.0 g. of sodium amide in 150 ml. of toluene is heated on a steam bath. At 50° C. a spontaneous reaction occurs, the temperature rising to 70° C. When the evolution of ammonia slackens, the mixture is heated at 90° C. for four hours. The suspension is cooled and a few ml. of ethanol is added to destroy any unreacted sodium amide. The mixture is washed with water and then extracted with two 100 ml. portions of 10% hydrochloric acid. The combined acidic extracts are made alkaline with 3 N sodium hydroxide solution and the supernatant liquid is then decanted from the gun, which solidifies when triturated with ethanol. After two recrystallizations from ethanol there is obtained 23.0 g. of 3-(1-piperidyl)-1,1-diphenylpropyl ethyl sulfone, M. P. 117.5–119° C. (corr.).

EXAMPLE 2

A. *Benzohydryl methyl sulfone.*—A solution of 60 g. of diphenylmethanethiol (of about 83% purity), 6.9 g. of sodium, and 18.9 ml. of methyl iodide in 300 ml. of ethanol is stirred under reflux for three hours. The ethanol is removed by distillation in vacuo and the residue poured into water. The oil is taken up in ether, the ether extract dried over anhydrous sodium sulfate, and the ether removed by distillation. The residue is distilled in vacuo yielding the main fraction of 31 g., b. p. 135° C. at 1.5 mm. To a stirred solution of 28.3 g. of this benzohydryl methyl sulfide in 78 ml. of acetic acid held at 80° C. is added dropwise 78 ml. of 30% hydrogen peroxide solution over a period of about thirty minutes. After being stirred an additional thirty minutes, the reaction mixture is poured into water, and the precipitated solid is collected by filtration and recrystallized from dilute ethanol yielding about 29 g. of benzohydrylmethyl sulfone, M. P. 127–8.5° C.

B. *3 -(1-piperidyl) 1,1- diphenylpropyl methyl sulfone.*—This preparation is carried out according to the directions given in Example 1–C, but using 36.9 g. of benzohydryl methyl sulfone, 6.0 g. of sodium amide, and 22.2 g. of 2-(1-piperidyl)-ethyl chloride in 150 ml. of toluene at 90° C. for four hours. The product, 3-(1-piperidyl)-1,1-diphenylpropyl methyl sulfone, after recrystallization of 36 g. of crude crystalline sulfone, melts at 122.6–123.6° C. (corr.). When a sample of this basic sulfone is admixed with a sample of benzohydryl 3-(1-piperidyl)propyl sulfone, M. P. 119–120° C. (disclosed and claimed in the copending Archer and Suter application Serial No. 150,556, filed March 18, 1950), a clear melt results before the temperature reaches 105° C., thus establishing the non-identity of the two samples.

If the above preparation is run, but substituting 3-dimethylamino-2-propyl chloride for 2-(1-piperidyl)ethyl chloride, there is obtained, after two recrystallizations from ethanol, 3-dimethylamino-1,1-diphenylbutyl methyl sulfone, M. P. 148.6–150° C. (corr.).

EXAMPLE 3

A. *3-dimethylamino-1,1-diphenylbutyl ethyl sulfone.*—When a mixture of 39 g. of benzohydryl ethyl sulfone, 6.3 g. of sodium amide, and 20 g. of 3-dimethylamino-2-propyl chloride is heated for four hours and then worked up according to the directions given in Example 1–C, the hydrochloride of the desired amino sulfone (about 27 g.) separates from the acidic extract directly. Recrystallization from ethanol-ethyl acetate yields the purified product, 3-dimethylamino-1,1-diphenylbutyl ethyl sulfone hydrochloride, M. P. 205–206.5° C. (corr.). The filtrate from the hydrochloride is made basic, and the base that separates is converted to the hydrochloride as above to give an additional 8 g. of product.

The preparation described in the previous paragraph can also be run using sodium hydride as the basic condensing agent. The following procedure is exemplary: A mixture of 332 g. of ethyl benzohydryl sulfone and 38.3 g. of sodium hydride in 1280 ml. of dry benzene is heated with stirring for twenty-six hours. Then 180 g. of 3-dimethylamino-2-propyl chloride is added dropwise over a period of one hour. After heating for an additional five hours, the mixture is cooled and 30 ml. of ethanol added to destroy the excess sodium hydride. The suspension is washed with two 500 ml. portions of water and then shaken with 600 ml. of 2.5 N hydrochloric acid. A part of the hydrochloride of the basic product separates immediately. The benzene layer is decanted and washed with 200 ml. of 10% hydrochloric acid. The acid fractions are combined and cooled to 5° C. The salt, 3-dimethylamino-1,1-diphenylbutyl ethyl sulfone hydrochloride, is collected and washed with 100 ml. of 6 N hydrochloric acid. The combined acid filtrates yield 19 g. of crude 3-dimethylamino-1,1-diphenylbutyl ethyl sulfone after being made alkaline with sodium hydroxide solution. The main portion of the hydrochloride salt is dissolved in 2 liters of water and 600 ml. of ethanol, filtered and made basic with 35% sodium hydroxide solution. The suspension is cooled in ice with stirring for one half hour and then filtered. The base is collected and combined with the crude crop obtained above, the total yield being 236 g. or 54% of theory. On recrystallization from ethanol there is obtained 196 g. (45%) of 3-dimethylamino-1,1-diphenylbutyl ethyl sulfone (this material is suitable for use in the resolution as described in Example 3B). An analytical sample is obtained after two more crystallizations from ethanol, M. P. 150.5–151.8° C. (corr.).

Concentration of the benzene fraction gives a recovery of 97 g. (29%) of benzohydryl ethyl sulfone which has not reacted.

The condensation using sodium hydride just described can be run substituting toluene for benzene. The mixture of benzohydryl ethyl sulfone, dry toluene and sodium hydride is kept at 110° C. until the evolution of hydrogen subsides (about three hours), and then the 3-dimethylamino-2-propyl chloride is added and the preparation continued as above.

B. *Resolution of 3-dimethylamino-1,1-diphenylbutyl ethyl sulfone.*—The preparation described in Example 3A is racemic. It can be resolved into the two optically active forms by taking advantage of the difference in solubility of the diastereoisomeric dextro-bitartrate in aqueous acetone. A levorotatory salt separates first; this yields a crystalline base which is dextrorotatory in acetone. A two per cent solution of the base in U. S. P. ethanol does not give any measurable rotation. On the other hand, the hydrochloride is levorotatory in aqueous solution. For convenience, the sulfone which yields levorotatory salts is designated as the levo-base. The isomeric sulfone is obtained from the filtrates of the levo-bitartrate after treatment with ammonia followed by dilution. It is of interest to note that the active bases and hydrochlorides melt lower than the corresponding racemic substances.

*Levo-3-dimethylamino-1,1-diphenylbutyl ethyl sulfone and salts thereof.*—A solution of 196 g. of dl-3-dimethylamino-1,1-diphenylbutyl ethyl sulfone (as prepared in Example 3A) in 3 liters of acetone is added to a solution of 88 g. of dextro-tartaric acid in an equal volume of water and then cooled to 5° C. for 24 hours. The crystals that separate are washed with 200 ml. of cold 50% acetone and then with pure acetone. After drying at 50° C. there is obtained 119 g. (79%) of levo-3-dimethylamino-1,1-diphenylbutyl ethyl sulfone dextro-bitartrate, M. P. 169–171° C., as a dihydrate.

The filtrates are made basic with 75 ml. of concentrated ammonium hydroxide, stirred at 10° C. for one-half hour and then filtered. The solid, which is the racemic base, amounts to 50 g. It is resolved as above and an additional 21 g. of the levo-sulfone dextro-bitartrate is obtained. The recovery of racemic base is 22 g. A second crop yields an additional 6 g. of levo salt. The combined fractions of practically pure levo-sulfone dextro-bitartrate weighs 146 g. or 96% of the theoretical. It is dissolved in 1200 ml. of 50% acetone containing 3.0 g. of dextro-tartaric acid and cooled. The solid is collected and dried at 50° C. to give 136 g. of pure levo-sulfone dextro-bitartrate dihydrate which is converted to the anhydrous form by drying at 85° C. for fifteen hours. The anhydrous levo-sulfone dextro-bitartrate melts at 171–172.5° C. (corr.).

Addition of ammonia to the filtrate from the above crystallization causes 4.7 g. of dl-base, M. P. 145–148° C., to separate.

The levo-sulfone base is prepared by dissolving 191 g. of the pure levo-sulfone dextro-bitartrate in 1800 ml. of 50% acetone and making the solution alkaline with concentrated ammonium hydroxide. After cooling to 5° C. the solid is collected and dried; wt. 120 g. It is recrystallized from 95% ethanol, yielding levo-3-dimethylamino-1,1-diphenylbutyl ethyl sulfone, M. P. 110–110.8° C. (corr.).

The levo-hydrochloride is prepared by dissolving at 80° C. 115 g. of the levo-sulfone base in 250 ml. of water containing 35 ml. of concentrated hydrochloric acid and cooling to 5° C. The salt is filtered and dried to constant weight at 70° C.; wt. 118 g. It is recrystallized from 700 ml. of acetone to give 100 g. of pure levo-3-dimethylamino-1,1-diphenylbutyl ethyl sulfone hydrochloride, M. P. 196–197° C. (corr.).

*Dextro - 3 - dimethylamino-1,1-diphenylbutyl ethyl sulfone and salts thereof.*—The combined ammoniacal filtrates from which all the racemic base has been removed are diluted to 16 liters and allowed to cool after crystallization starts. The solid that separates weighs 60 g. and melts at 106–110° C. After recrystallization from 140 ml. of 95% ethanol the pure dextro-3-dimethylamino-1,1-diphenylbutyl ethyl sulfone, M. P. 110–110.6° C. (corr.) is obtained.

Twenty grams of the dextro-sulfone base is dissolved in 40 ml. of water containing 6 ml. of hydrochloric acid and cooled. The dextro-sulfone hydrochloride is collected and dried; wt. 21 g. After recrystallization from acetone the pure dextro-3-dimethylamino-1,1-diphenylbutyl ethyl sulfone hydrochloride amounts to 15 g., M. P. 196.8–198° C. (corr.).

The dextro-sulfone dextro-bitartrate is prepared in 50% acetone from equimolar quantities of the dextro-sulfone base and dextro-tartaric acid. From 5.3 g. of base there is obtained 4.5 g. of pure dextro-3-dimethylamino-1,1-diphenylbutyl ethyl sulfone dextro-bitartrate, M. P. 166–169° C. (corr.).

The properties of all the above optically active compounds are listed in Table 1.

*Table 1*

| Compound | M. P. °C. (corr.) | $[\alpha]$ D 27°C. |
|---|---|---|
| Dextro-sulfone base | 110–110.6 | −10 (c=2%, in acetone). 0 (c=2%, in U. S. P. ethanol). +33.8 (c=5%, in water+HCl)[1] |
| Levo-sulfone base | 110–110.8 | +12 (c=2%, in acetone). 0 (c=2%, in U. S. P. ethanol). −31.6 (c=5%, in water+HCl)[1] |
| Dextro-sulfone HCl | 196.8–198 | +34.6 (c=1.5%, in water). |
| Levo-sulfone HCl | 196–197 | −36.4 (c=5%, in water). −32.6 (c=1.5%, in water). |
| Dextro-sulfone dextro-bitartrate. | 166–169 | +45 (c=2%, in 50% aqueous methanol). |
| Levo-sulfone dextro-bitartrate. | 171–172.5 | −22.5 (c=2%, in 50% aqueous methanol). |

[1] Five percent solution of base in water plus equivalent quantity of conc. HCl.

C. *Structure proof of basic sulfone of Example 3A.*—In the condensation of benzohydryl ethyl sulfone with 3-dimethylamino-2-propyl chloride two isomeric products are possible depending on whether or not rearrangement of the entering alkamine group occurs. These two possible isomers are 3-dimethylamino-1,1-diphenylbutyl ethyl sulfone (I) and 3-dimethylamino-2-methyl-1,1-diphenylpropyl ethyl sulfone (II), having the formulas:

I
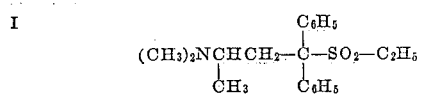

II
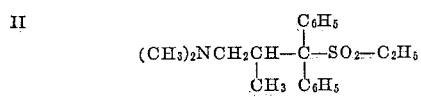

While it is possible that both of these isomers may be formed in the reaction, we have so far only obtained one compound in a crystalline form from the reaction mixture. As shown in the following presentation the compound isolated has the structure I, and arises from a rearrangement during the condensation.

The structure proof can be represented by the following two equations:

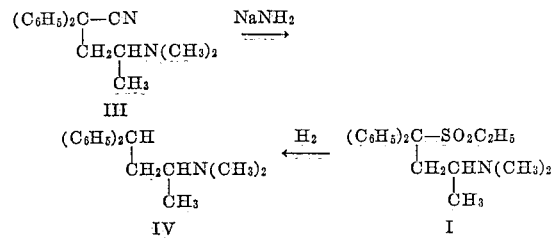

Previous workers have prepared the nitrile III by other methods and proved its structure (Schutz et al., JACS 69, 188, 2454 (1947); Easton et al., ibid. 69, 2941 (1947)). When it is heated with excess sodium amide in boiling toluene, the CN group is replaced by hydrogen to give the base IV (see below for experimental data), which forms a nicely crystalline hydrochloride which melts at 156-158° C. after recrystallization from acetone. When the sulfone, I, is refluxed in ethanol with Raney nickel catalyst, hydrogenolysis occurs at the carbon-sulfur bond. A high boiling basic oil is obtained which yields a hydrochloride identical with the one prepared from III. Since neither step in the degradations involves the side chain, the evidence is conclusive that the crystalline basic sulfone isolated from the reaction mixture of Example 3A (reaction of benzohydryl ethyl sulfone with 3-dimethylamino-2-propyl chloride) is 3-dimethylamino-1,1-diphenylbutyl ethyl sulfone and has the structure of formula I.

*Cleavage of 4-dimethylamino-2,2-diphenylbutane-3-nitrile.*—A mixture of 27.8 g. of 4-dimethylamino-2,2-diphenylbutanenitrile, 15.6 g. of sodium amide, and 150 ml. of dry toluene is refluxed with stirring for twelve hours. Excess sodium amide is destroyed with ethanol and the mixture then poured into water. The toluene layer is shaken with dilute hydrochloric acid and the acid extract then made basic with dilute sodium hydroxide solution. The oil that separates is extracted with ether and dried over anhydrous sodium sulfate. The solvent is removed by distillation and the residue converted into the hydrochloride, which after two recrystallizations from acetone, melts at 156-158° C. (corr.). This compound is 3-dimethylamino-1,1-diphenylbutane hydrochloride.

*Cleavage of 3-dimethylamino-1,1-diphenylbutyl ethyl sulfone.*—The basic sulfone hydrochloride obtained in Example 3A by condensing benzohydryl ethyl sulfone with 3-dimethylamino-2-propyl chloride is converted into the corresponding base by dissolving the salt in water, liberating the basic sulfone with dilute sodium hydroxide solution, extracting said sulfone with ether, and evaporating the ether extract to dryness. Ten grams of this sulfone is dissolved in 300 ml. of ethanol and the resulting solution is heated under reflux with approximately 200 g. of Raney nickel catalyst for six hours. The metal is then removed and the filtrate concentrated to dryness. The residue is covered with 30 ml. of n-hexane and cooled. The gummy solid that does not dissolve is removed by filtration and the filtrate extracted with dilute hydrochloric acid. The extracts are made basic and the liberated oil is extracted with ether. After the ether solution is dried with anhydrous sodium sulfate, the ether is removed by distillation and the residue distilled to give 3.0 g. of colorless oil, B. P. 138-140° C. at 1 mm. This is dissolved in ether and treated with ethanolic hydrogen chloride. A gum separates which solidifies on trituration with acetone. After two recrystallizations from acetone the salt melts at 155-157° C. (corr.) and does not depress the M. P. of the hydrochloride obtained by the cleavage of 4-dimethylamino-2,2-diphenylbutanenitrile. Thus, this product also is 3-dimethylamino-1,1-diphenylbutane hydrochloride.

EXAMPLE 4

*3-diethylamino-1,1-diphenylpropyl ethyl sulfone hydrochloride.*—If the directions given in Example 1-C are followed, but using 22 g. of benzohydryl ethyl sulfone, 3.4 g. of sodium amide, 11.8 g. of 2-diethylaminoethyl chloride, and 85 ml. of dry toluene, there is obtained a gum which is taken up in alcoholic hydrogen chloride. The hydrochloride of the base (about 10 g.) precipitates on cooling. After two recrystallizations from methanol-ether, about 8.0 g. of 3-diethylamino-1,1-diphenylpropyl ethyl sulfone hydrochloride, M. P. 166.5-168° C. (corr.), is obtained.

EXAMPLE 5

A. *9-fluorenethiol.*—A solution of 52 g. of 9-chlorofluorene and 21.2 g. of thiourea in 150 ml. of ethanol is refluxed for two hours. Then 180 ml. of 10% sodium hydroxide solution is added and boiling is continued for ninety minutes. A solution of 14 ml. of sulfuric acid in 100 ml. of water is added to the mixture, and the solid that separates on cooling is filtered and recrystallized twice from methanol containing a small quantity of acetic acid. The resulting 9-fluorenethiol, which separates as shining white plates, melts at 105-106° C.

B. *9-fluorenyl ethyl sulfone.*—About 20 g. of 9-fluorenethiol is dissolved in 100 ml. of ethanol containing 2.3 g. of sodium and 10.9 g. of ethyl bromide, and the resulting solution is refluxed for two hours and then poured into water. The solid that separates (about 20 g.) is collected and dissolved in 100 ml. of acetic acid. To the stirred acidic solution maintained at 80-90° C. is added dropwise 55 ml. of 30% hydrogen peroxide. Heating at 95° C. is continued for thirty minutes after all the peroxide has been added. The solution is poured into water, and the precipitated solid is filtered and recrystallized from ethanol. About 9.2 g. of 9-fluorenyl ethyl sulfone, M. P. about 168° C., is obtained. This sulfone can be recrystallized from ethanol to afford an analytically pure sample.

C. *9-(2-(1-piperidyl)ethyl)-9-fluorenyl ethyl sulfone hydrochloride.*—A mixture of 9.2 g. of 9-fluorenyl ethyl sulfone, 4.2 g. of 2-(1-piperidyl)ethyl chloride, and 1.5 g. of sodium amide in 40 ml. of toluene is refluxed for five hours. After processing in the manner described above in Example 1-C, there is obtained an oily sulfone which is taken into ether. The ether solution is dried over anhydrous sodium sulfate, the ether is removed by distillation, and the residue is treated with alcoholic hydrogen chloride to yield the hydrochloride of 9-(2-(1-piperidyl)ethyl)-9-fluorenyl ethyl sulfone, which, after recrystallization from methanol-ether, melts at 194.8–196.8° C. (corr.).

EXAMPLE 6

*1,1-diphenyl-4-(1-piperidyl)butyl ethyl sulfone.*—A mixture of 24.6 g. of benzohydryl ethyl sulfone, 3.7 g. of sodamide, 15.4 g. of 3-(1-piperidyl)propyl chloride, and 100 ml. of toluene is heated under reflux for three hours. Then 10 ml. of ethanol is added to destroy any excess sodium amide, and the mixture is diluted with water. The toluene layer is separated and extracted with dilute hydrochloric acid. The acidic extract is made alkaline with dilute sodium hydroxide solution, whereupon there separates an oil which is taken up into ether. After drying the ethereal extract over anhydrous sodium sulfate, the ether is removed by distilling in vacuo, and the resulting residue is triturated with a small amount of ether and petroleum ether (n-pentane) until crystallization results. There is obtained 11.4 g. of crude product, which, after recrystallization from ethanol, melts at 112–113.5° C. (corr.). This product is 1,1-diphenyl-4-(1-piperidyl)butyl ethyl sulfone.

When 1,1-diphenyl-4-(1-piperidyl)butyl ethyl sulfone is treated with methyl bromide, the corresponding methyl bromide quaternary derivative is obtained. Similarly, using benzyl chloride instead of methyl bromide, the corresponding benzyl chloride quaternary derivative is formed.

EXAMPLE 7

A. *Benzohydryl n-propyl sulfone.*—To an ethanolic solution of sodium ethoxide (from 4.6 g. of sodium and 200 ml. of absolute ethanol) are added 40 g. of diphenylmethanethiol and 18.3 ml. (24.6 g.) of n-propyl bromide. After refluxing for three hours, the ethanol is removed by distillation, the residual solution poured into water, and the resulting mixture extracted with ether. The ether is removed by distillation, the residue covered with toluene, and the latter removed by distillation.

The resulting benzohydryl n-propyl sulfide is dissolved in 75 ml. of acetic acid, and 60 ml. of 30% hydrogen peroxide solution is added dropwise with stirring over a period of about thirty minutes, while keeping the temperature of the reaction mixture between 80–90° C. After the reaction mixture has been allowed to cool, it is poured into water. The resulting precipitate is filtered, washed well with water, and recrystallized from ethanol-water to yield about 38 g. of benzohydryl n-propyl sulfone, M. P. 110–3° C.

B. *3-dimethylamino-1,1-diphenylbutyl n-propyl sulfone bitartrate.*—A mixture of 27.6 g. of benzohydryl n-propyl sulfone, 12.5 g. of 2-dimethylamino-1-propyl chloride, 6.0 g. of sodium amide, and 100 ml. of dry toluene is heated to about 100° C. whereupon an exothermic reaction ensues, causing the temperature to rise about six degrees. After about fifteen minutes the exothermic reaction subsides, and the reaction mixture is refluxed for an additional five hours. Ethanol and water are added to the cooled reaction mixture to decompose the excess sodium amide. The toluene layer is separated and extracted with dilute hydrochloric acid. The acidic layer is then extracted with ether and made basic with dilute sodium hydroxide solution to yield a gum, which is taken up in chloroform. After removal of the chloroform by vacuum distillation, the residue is taken up in a solution of 10.0 g. of tartaric acid in 20 ml. of water. The resulting solution is placed in an icebox overnight. The precipitated salt is filtered, and recrystallized once from water and twice from ethanol-ether, giving 3-dimethylamino-1,1-diphenylbutyl n-propyl sulfone bitartrate, M. P. 148.2–151° C. (corr.).

EXAMPLE 8

A. *Benzohydryl isopropyl sulfone.*—This preparation is carried out essentially like that shown in example 7A, but using 19.9 ml. of isopropyl iodide in place of 18.3 ml. of n-propyl bromide and a reflux period of five hours instead of three. The benzohydryl isopropyl sulfide is oxidized according to the directions given in example 7A, and there is thus obtined 35.8 g. of benzohydryl isopropyl sulfone, M. P. 190–2° C.

B. *3-dimethyl-1,1-diphenylbutyl 2-propyl sulfone bitartrate.*—This preparation is carried out like that described in Example 7B, but using benzohydryl isopropyl sulfone in place of benzohydryl n-propyl sulfone. The resulting basic sulfone is 3-dimethylamino-1,1-diphenylbutyl 2-propyl sulfone bitartrate.

EXAMPLE 9

*3-dimethylamino-1,1-diphenylpropyl ethyl sulfone hydrochloride.*—This preparation is carried out according to the directions given in Example 4, but using 26 g. of benzohydryl ethyl sulfone, 14.4 g. of 2-dimethylaminoethyl chloride hydrochloride, 10 g. of sodium amide, and 100 ml. of dry toluene. After two recrystallizations from ethyl acetate (plus a small quantity of absolute ethanol), the resulting product, 3-dimethylamino-1,1-diphenylpropyl ethyl sulfone hydrochloride melts at 202.8–204.8° C. (corr.).

EXAMPLE 10

A. *Benzohydryl cyclopentyl sulfone.*—To a solution of 120 ml. of absolute ethanol containing 4.6 g. of sodium is added 40 g. of diphenylmethanethiol followed by 30 g. of cyclopentyl bromide. The reaction mixture is heated with stirring for four hours and then poured onto ice and water. The semi-solid material that separates is taken up in toluene, and the toluene removed by distilling in vacuo.

The residual benzohydryl cyclopentyl sulfide is dissolved in 120 ml. of acetic acid, and 70 ml. of 30% hydrogen peroxide solution is added dropwise with stirring over a period of about thirty minutes, while keeping the temperature of the reaction mixture between 60–75° C. After addition of the hydrogen peroxide has been completed, the reaction mixture is heated at 80–90° C. for an additional thirty minutes, and then poured onto ice and water. The solid that separates is filtered and recrystallized once from ethyl acetate-dioxane and once from dioxane to give the product, benzohydryl cyclopentyl sulfone, M. P. 193–4° C.

When the above procedure is followed but using cyclohexyl bromide in place of cyclopentyl bromide, the product that results is benzohydryl cyclohexyl sulfone.

B. *3 - dimethylamino-1,1-diphenylbutyl cyclopentyl sulfone.*—When the procedure used in Example 6 is followed, but using 30 g. of benzohydryl cyclopentyl sulfone, 100 ml. of dry toluene, 10 g. of sodium amide, and 16.2 g. of 2-dimethylamino-1-propyl chloride, there is obtained as the product 3-dimethylamino-1,1-diphenylbutyl cyclopentyl sulfone.

When benzohydryl cyclohexyl sulfone is used in place of benzohydryl cyclopentyl sulfone in the above procedure, there is obtained as the product 3-dimethylamino-1,1-diphenylbutyl cyclohexyl sulfone.

EXAMPLE 11

A. *Benzohydryl isobutyl sulfone.*—This preparation is carried out like that described in Example 10A, but using 27.4 g. of isobutyl bromide in place of the cyclopentyl bromide. The resulting product, benzohydryl isobutyl sulfone, melts at 130–1° C. after being recrystallized from ethanol-water.

B. *3-(1-piperidyl)-1,1-diphenylpropyl isobutyl sulfone.*—This preparation is carried out like that described in Example 1C, but using 28.8 g. of benzohydryl isobutyl sulfone, 10 g. of sodium amide, 100 ml. of dry toluene, and 18.4 g. of 2 - (1 - piperidyl)ethyl chloride hydrochloride. The resulting product is 3-(1-piperidyl)-1,1-diphenylpropyl isobutyl sulfone.

EXAMPLE 12

*3-(1-piperidyl) - 1,1 - diphenylbutyl ethyl sulfone.*—16.4 g. of 2-(1-piperidyl)-1-propyl chloride is added dropwise to a stirred mixture containing 26 g. of ethyl benzohydryl sulfone, 100 ml. of toluene, and 6 g. of sodium amide at 80° C. whereupon the temperature rises rapidly to about 112° C. The resulting reaction mixture is then refluxed for three hours and cooled. After ethanol has been added to destroy the excess sodium amide, water is added, and the organic layer separated and extracted with 20% aqueous hydrochloric acid. The acidic extract is made alkaline with dilute sodium hydroxide solution and the liberated basic product is taken up in chloroform. Removal of the chloroform by distilling in vacuo leaves a residue, which is covered with benzene, which in turn is removed by distilling in vacuo. Trituration of the residue with ether results in the formation of a solid, which is filtered, washed with ether and then n-pentane, and recrystallized from methanol. The resulting product is probably 3-(1-piperidyl)-1,1-diphenylbutyl ethyl sulfone, M. P. 160–161.6° C. (corr.), of the formula $$\begin{array}{c} CH_2-CH_2 \\ CH_2 \quad\quad N-CH(CH_3)CH_2C(C_6H_5)(C_6H_5)-SO_2-C_2H_5 \\ CH_2-CH_2 \end{array}$$

The structure of this basic sulfone is assigned by analogy on the basis of the structure proof of the isomeric 3-dimethylamino-1,1-diphenylbutyl ethyl sulfone, as described in Example 3C.

We claim:

1. A member of the group consisting of a basic sulfone having the formula

B—X—C(Ar)(Ar')—SO$_2$—R where B is a lower dialkylamino group in which the alkyl groups may be joined to form a heterocyclic radial of the group consisting of piperidines, morpholines and pyrrolidines, X is a lower alkylene group, Ar and Ar' are aryl groups of the benzene series, and R is a lower hydrocarbon radical having 1–8 carbon atoms, said hydrocarbon radical being selected from the group consisting of alkyl and cycloalkyl having 3–6 ring-carbon atoms, and acid-addition and quaternary ammonium salts thereof.

2. A basic sulfone having the formula

B—X—C(Ar)(Ar')—SO$_2$—R where B is a lower dialkylamino group, X is a lower alkylene group, Ar and Ar' are aryl groups of the benzene series, and R is a lower alkyl group.

3. A basic sulfone having the formula

B—X—C(Ar)(Ar')—SO$_2$—C$_2$H$_5$ where B is a lower dialkylamino group, X is a lower alkylene group, and Ar and Ar' are aryl groups of the benzene series.

4. A basic sulfone having the formula

B—CH(CH$_3$)CH$_2$C(Ar)(Ar')—SO$_2$—C$_2$H$_5$ where B is a lower dialkylamino group, and Ar and Ar' are aryl groups of the benzene series.

5. A basic sulfone having the formula

B—CH(CH$_3$)CH$_2$C(C$_6$H$_5$)(C$_6$H$_5$)—SO$_2$—C$_2$H$_5$ where B is a lower dialkylamino group.

6. A 3-dimethylamino-1,1-diphenylbutyl ethyl sulfone.

7. Levo - 3 - dimethylamino-1,1 - diphenylbutyl ethyl sulfone.

8. The process of preparing a basic sulfone having the formula

B—X—C(Ar)(Ar')—SO$_2$—R where B is a lower dialkylamino group in which the alkyl groups may be joined to form a heterocyclic radical of the group consisting of piperidines, morpholines and pyrrolidines, X is a lower alkylene group, Ar and Ar' are aryl groups of the benzene series, and R is a lower hydrocarbon radical having 1–8 carbon atoms, said hydrocarbon radical being selected from the group consisting of alkyl and cycloalkyl having 3–6 ring-carbon atoms, which comprises heating a sulfone having the formula, ArCH(Ar')—SO$_2$—R, with an aminoalkyl halide having the formula B—X—halogen where B and X have the meanings designated hereinabove in the presence of a basic condensing agent.

9. The process of preparing a basic sulfone having the formula

B—X—C(Ar)(Ar')—SO$_2$—R where B is a lower dialkylamino group, X is a lower alkylene group, Ar and Ar' are aryl groups of the benzene series, and R is a lower alkyl group, which comprises heating a sulfone having the formula, ArCH(Ar')—SO$_2$—R, with an aminoalkyl halide having the formula, B—X—halogen, where B and X have the meanings designated hereinabove in the presence of sodium amide.

10. A basic sulfone having the formula

B—X—C(Ar)(Ar')—SO$_2$—R where B is a 1-piperidyl group, X is a lower alkylene group, Ar and Ar' are aryl groups of the benzene series, and R is lower alkyl.

11. A basic sulfone having the formula $$B-X-C(Ar)(Ar')-SO_2-C_2H_5$$

where B is a 1-piperidyl group, X is a lower alkylene group, and Ar and Ar' are aryl groups of the benzene series.

12. A basic sulfone having the formula $$B-CH(CH_3)CH_2C(Ar)(Ar')-SO_2-C_2H_5$$

where B is a 1-piperidyl group, and Ar and Ar' are aryl groups of the benzene series.

13. 3-(1-piperidyl)-1,1-diphenylbutyl ethyl sulfone.

14. 3-(1-piperidyl)-1,1-diphenylpropyl methyl sulfone.

15. 3-dimethylamino-1,1-diphenylpropyl ethyl sulfone.

16. The process of preparing a basic sulfone having the formula $$B-X-C(Ar)(Ar')-SO_2-C_2H_5$$

where B is a lower dialkylamino group, X is a lower alkylene group, and Ar and Ar' are aryl groups of the benzene series, which comprises heating a sulfone having the formula, $$ArCH(Ar')-SO_2-C_2H_5$$

with an aminoalkyl halide having the formula, B—X—halogen, where B and X have the meanings designated hereinabove, in the presence of sodium amide.

17. The process of preparing a basic sulfone having the formula $$B-X-CH(Ar)(Ar')-SO_2-R$$

where B is a 1-piperidyl group, X is a lower alkylene group, Ar and Ar' are aryl groups of the benzene series, and R is a lower alkyl group, which comprises heating a sulfone having the formula, ArCH(Ar')—SO_2—R, with an aminoalkyl halide having the formula, B—X—halogen, where B and X have the meanings designated hereinabove, in the presence of sodium amide.

18. The process of preparing a basic sulfone having the formula $$B-X-CH(Ar)(Ar')-SO_2-C_2H_5$$

where B is a 1-piperidyl group, X is a lower alkylene group, Ar and Ar' are aryl groups of the benzene series, which comprises heating a sulfone having the formula, ArCH(Ar')—SO_2—C_2H_5, with an aminoalkyl halide having the formula, B—X—halogen, where B and X have the meanings designated hereinabove, in the presence of sodium amide.

19. A basic sulfone having the formula $$B-X-C(C_6H_5)_2-SO_2-R$$

where B is a lower dialkylamino group, X is a lower alkylene group and R is a lower alkyl group.

20. A basic sulfone having the formula $$B-X-C(C_6H_5)_2-SO_2-R$$

where B is a 1-piperidyl group, X is a lower alkylene group and R is a lower alkyl group.

21. The process of preparing a basic compound having the formula $$B-X-C(C_6H_5)_2-SO_2-R$$

where B is a lower dialkylamino group, X is a lower alkylene group and R is a lower alkyl group, which comprises heating a sulfone having the formula, $(C_6H_5)_2CH-SO_2-R$, with an aminoalkyl halide having the formula B—X—halogen where B, X and R have the meanings designated hereinabove, in the presence of a basic condensing agent.

22. The process of preparing a basic compound having the formula $$B-X-C(C_6H_5)_2-SO_2-R$$

where B is a 1-piperidyl group, X is a lower alkylene group and R is lower alkyl, which comprises heating a sulfone having the formula, $(C_6H_5)_2CH-SO_2-R$, with an aminoalkyl halide having the formula, B—X—halogen, where B, X and R have the meanings designated hereinabove, in the presence of a basic condensing agent.

SYDNEY ARCHER.
CHESTER M. SUTER.
BENJAMIN F. TULLAR.

REFERENCES CITED

The following references are of record in the file of this patent:

UNITED STATES PATENTS

| Number | Name | Date |
|---|---|---|
| 2,140,608 | Ufer | Dec. 20, 1938 |
| 2,207,021 | Martin et al. | July 9, 1940 |

OTHER REFERENCES

Eisleb: Ber. der Deu. Chem., vol. 74B (1941), p. 1438.